United States Patent [19]
Walker et al.

[11] 3,852,369

[45] Dec. 3, 1974

[54] PROCESSES FOR DEHYDROGENATION OF HYDROCARBONS

[75] Inventors: Darrell W. Walker; Brent J. Bertus; Floyd Farha, Jr., all of Bartlesville, Okla.

[73] Assignee: Phillips Petroleum Company, Bartlesville, Okla.

[22] Filed: May 24, 1973

[21] Appl. No.: 363,485

Related U.S. Application Data

[63] Continuation-in-part of Ser. No. 140,966, May 6, 1971, Pat. No. 3,781,223.

[52] U.S. Cl. ............................ 260/680 E, 260/683.3
[51] Int. Cl. ........................................... C07c 5/18
[58] Field of Search ..................... 260/680 E, 683.3

[56] References Cited
UNITED STATES PATENTS 3,414,631  12/1968  Grasselli et al................. 260/680 E
3,555,105  1/1971  Nolan et al...................... 260/680 E Primary Examiner—Paul M. Coughlan, Jr.

[57] ABSTRACT

Organic compounds are dehydrogenated to compounds having a higher degree of unsaturation by contacting the feedstock in the vapor phase in the presence of an oxygen-containing gas with a catalyst comprising at least one of nickel, cobalt or iron in association with tin and phosphorus. Representative of such conversions is the oxidative dehydrogenation of butane to butenes and butadiene, isopentane to isoamylenes and isoprene, and butenes to butadiene. The conversion products are valuable compounds particularly useful as intermediates for the preparation of polymeric materials such as synthetic rubbers and the like.

8 Claims, No Drawings

PROCESSES FOR DEHYDROGENATION OF HYDROCARBONS

This application is a continuation-in-part of our co-pending application Ser. No. 140,966 filed May 6, 1971, now U.S. Pat. No. 3,781,223.

The present invention relates to chemical compositions and chemical processes. More particularly, the invention relates to catalyst compositions, their preparation, and to catalytic processes employing such compositions, e.g., processes for effecting the dehydrogenation of hydrocarbons.

Dehydrogenation processes for the conversion of organic compounds to compounds having a higher degree of unsaturation include both thermal noncatalytic processes and catalytic processes. The former are characterized by undesirable side reactions, low order of conversion and yield and poor product selectivity. The catalytic processes are generally characterized by the particular catalytic material employed and the conditions under which the processes are operated, e.g., in the absence or presence of oxygen. While a number of such catalytic processes have attained some measure of commercial success, there is a continuing search to develop catalytic materials which exhibit the high activity, high yield of desired product, high selectivity to desired product, extended longevity, which can be readily regenerated to an activity approaching that of fresh catalyst, and which keep undesirable side reactions to a minimum; all characteristics of good dehydrogenation catalysts. The vexatious problem constantly faced by those skilled in the art is the identification and characterization of the compositions which are highly efficient dehydrogenation catalysts.

Among the more recently disclosed oxidative dehydrogenation catalysts are those which include halogens or halogen-releasing materials. Such catalysts have exhibited so many disadvantages in regard to equipment corrosion and the additional expense of continuously feeding, recovering and recycling the relatively expensive halogen materials that economically practical, large scale use of such catalytic materials has been precluded. Halogen-free catalytic materials continue to be the most desirable for use in oxidative dehydrogenation processes.

The present invention provides a novel catalyst and a novel process for the conversion of hydrocarbon feedstocks to hydrocarbons having a higher degree of unsaturation and which have the same or lower number of carbon atoms as the hydrocarbon feed. According to this invention, hydrocarbon feedstocks can be converted directly to hydrocarbons having a greater degree of unsaturation by contacting said feedstock under dehydrogenation conditions in the vapor phase in the presence of molecular oxygen with a catalytic material comprising a combination of at least one nickel, cobalt or iron in association with tin, phosphorus and oxygen. Thus, paraffinic hydrocarbons can be converted in good yields to diolefins and/or monoolefins and monoolefins can be converted to diolefins. The invention is particularly applicable for the production of diolefins from paraffins and particularly useful results are obtained by the dehydrogenation of butane to butenes and butadiene, isopentane to isoamylenes and isoprene, and butenes to butadiene.

The hydrocarbon feedstocks which are applicable for the oxidative dehydrogenation processes of the present invention comprise dehydrogenatable aliphatic hydrocarbons having from about two to about 12 carbon atoms per molecule and at least one

grouping. Such hydrocarbons can be branched or unbranched and include paraffins as well as monoolefins. Particularly preferred are acyclic paraffins and monoolefins having four to 12 carbon atoms. The conversion of butane to butenes and butadiene, isopentane to isoamylenes and isoprene, and butenes to butadiene are presently considered most advantageous. Some specific examples of other feeds include isobutane, pentane, hexane, 2-methylhexane, octane, 2,4-dimethyloctane, 2-methylbutene-1, hexene-2, octene-1, 3-methylnonene-4, dodecene-1, and the like, and mixtures thereof.

The catalysts of the present invention comprise nickel or cobalt or iron associated with tin and also associated with phosphorus. For simplicity, the nickel, cobalt and iron group is referred to as the ferrous metals of Group VIII, or merely as the ferrous metals. The elements contained in the catalyst are not necessarily in the elemental state but can be combined with sufficient oxygen to form one or more neutral compounds such as nickel stannate, cobalt phosphate, iron stannate, nickel oxide, iron oxide, etc., depending upon the proportions of the elements present. It is presently preferred that a catalyst of the present invention contain each of the above-mentioned elements in amounts shown in the following table:

| Element | Weight Percent Broad | Preferred |
| --- | --- | --- |
| Ferrous metal | 26–75 | 30–45 |
| Tin | 1–50 | 14–35 |
| Phosphorus | 0.5–10 | 2–6 |

The percentages shown above are based on the total weight of the finished catalyst, and the difference between the total weights of the abovenamed elements and 100 percent is made up by its oxygen content in amounts sufficient to satisfy the valences of each of the elements in the catalyst.

These catalysts can also be supported on, or diluted with, conventional catalytic materials such as silica, alumina, boria, magnesia, titania, zirconia, and combinations thereof, as well as other similar conventional materials known in the art.

The catalysts of the present invention can be prepared by any suitable method. Conventional methods such as coprecipitation, impregnation, or dry mixing can be used. In general, any method can be used which will provide a composition containing the above-described elements in the above-described proportions and which will have a catalytic surface area of at least about 1 square meter per gram. Thus, a ferrous metal compound, a tin compound, and a phosphorus compound can be combined in any suitable way. Substantially any ferrous metal, tin, and phosphorus compound can be employed in the preparation so long as none of the compounds are detrimental to the final oxidative dehydrogenation catalyst and so long as elements other than oxygen in the compounds used are substantially removed from the final catalyst composition by prior washing or by volatilization. In some instances, however, small amounts of some of these other elements, which are involved in the preparation of the catalyst, can be tolerated in the final catalytic composition. For example, if a sulfate such as nickel sulfate or tin sulfate is employed in the preparation, small residual amounts of sulfur can be tolerated. Generally, however, the preferred ferrous metal, tin and phosphorous compounds are either the oxides of these elements or compounds convertible to the oxide on calcination. Some examples of these are nickel nitrate, cobalt acetate, iron oxide, phosphoric acid, nickel stannate, ammonium phosphate, and the like, including mixtures thereof.

In one suitable method of catalyst preparation, suitable ferrous metal compounds are coprecipitated with suitable tin compounds by mixing solutions of these compounds. The coprecipitation can be aided by the addition of an inorganic base such as an alkali metal or alkaline earth metal hydroxide to maintain the pH of the mixture above about 7. The precipitate is then filtered, washed of any extraneous ions, and then, either before or after drying, impregnated with a suitable phosphorus-containing compound such as phosphoric acid. This composite is then activated by calcination and oxygen-containing gas such as air at a temperature of 900°–1,800° F. for 1–24 hours, or until the catalyst is active for oxidative dehydrogenation. The solid catalyst composition can be conventionally formed and utilized in any conventional shape or form such as tablets, extrudates, granules, powder, agglomerates, and the like.

The hydrocarbon feedstocks can be dehydrogenated according to the process and for the catalyst of the present invention at temperatures in the range of from about 800° to about 1,300° F., preferably from about 950° to about 1,200° F., at any convenient pressure such as from about 7 to about 250 psia, and at a hydrocarbon:oxygen ratio of about 1:1 to about 1:4. The presence of steam is frequently beneficial and steam:-hydrocarbon ratios up to about 50:1 can be used. The hydrocarbon feed rate will generally be in the range of from about 50 to about 5,000 GHSV. The fixed catalyst bed is the preferred mode of contact, but other modes such as a fluidized bed, can also be used.

The dehydrogenation processes of this invention are ordinarily carried out by forming a mixture, preferably a preheated mixture, of a hydrocarbon feed, the oxygen-containing gas and the steam (if used) and passing this mixture over the catalyst at the desired temperature. The effluent from the reaction zone is subjected to any suitable separation method to isolate and recover the desired product. Unconverted feeds or partially converted materials can be recycled.

The catalysts of the present invention, when employed under suitable conditions, have a long active life and need seldom, if ever, undergo regeneration. However, when and if the catalyst becomes inactivated due to poisons in the system or for other reasons, it can be regenerated by simply cutting off the flow of feedstock while continuing the flow of oxygen-containing gas and steam at operating temperatures for a time sufficient to restore substantial activity to the catalyst.

Generally, at least trace amounts of oxygenated products, other than carbon oxides and water, are also formed in these reactions. For example, compounds such as furan, acetaldehyde, furfural and acetic acid and the like can be obtained. Some carbon oxides and cracking products can also be formed. In some instances, butadiene can be formed as a by-product for oxidative dehydrogenation of isopentane to isoprene.

The invention can be illustrated by the following examples.

EXAMPLE I

Preparation of Catalyst A

A 120 g quantity of $K_2SnO_3 \cdot 3H_2O$ was dissolved in sufficient distilled water to make a 200 cc solution. Similarly, 116.4 g of $Ni(NO_3)_2 \cdot 6H_2O$ was made into a 200 cc solution. Each of these solutions was added, simultaneously and dropwise, to 200 cc distilled water with stirring at room temperature. The pH during the addition was 7–9. The resulting precipitate was then filtered, washed three times with 750 cc portions of distilled water yielding 311 g of wet gel. A 103 g portion of the wet gel was then mixed with 6.0 g of $H_3PO_4$ (85 percent), then dried at 105° C., calcined at 1,100° F. for 3 hours in air, and ground and screened to 20–40 mesh. The catalyst was found to have a surface area of 8.1 m$^2$/g, and to contain 4.7% P, 26% Ni, 47 % Sn, and about 0.2% K, by weight.

EXAMPLE II

Preparation of Catalyst B

This was similar to that of Catalyst A. A 60 g quantity of $K_2SnO_3 \cdot 3H_2O$ and 58 g $Ni(NO_3)_2 \cdot 6H_2O$ were each dissolved in enough distilled water to make 200 cc solutions of each. Each of these solutions was then added simultaneously and dropwise to 200 cc of distilled water using sufficient 2N KOH to maintain a pH at 7–8 during the addition. The resulting precipitate was filtered and washed with 750 cc distilled water. The wet gel was then mixed with 7.5 g of $H_3PO_4$ (85 percent). The mixture was then dried for about 16 hours at 105° C., then calcined for 3 hours at 1,100° F. It was then ground and screened to a 20–40 mesh particle size. This catalyst was found to have a surface area of 110 m$^2$/g, and to contain 4.2 wt. % P.

EXAMPLE III

Preparation of Catalyst C

A 120 g quantity of $K_2SnO_3 \cdot 3H_2O$ and a 233 quantity of $Ni(NO_3)_2 \cdot 6H_2O$ were each dissolved with sufficient distilled water to make a 400 cc solution of each. Each of these solutions was then added simultaneously and dropwise to a 400 ml quantity of distilled water while maintaining a pH of 7–8 by the dropwise addition of 2N KOH. The resulting precipitate was filtered, washed three times, yielding 420 g of wet gel. A 70 g portion of the wet gel was then mixed with 2.0 g of $H_3PO_4$ (85 percent). The gel was then dried at 105° C., then calcined for three hours at 1,100° F. The solid was then ground and screened to a 20–40 mesh size. The finished catalyst was found to contain 2.8% P, 37% Sn, 32% Ni, and 0.09% K, by weight.

EXAMPLE IV

Preparation of Catalyst D

This catalyst was prepared in a manner very similar to that of Catalyst C, except that another 70 g portion of the wet gel produced by the method of Catalyst C was impregnated with 4.0 g $H_3PO_4$ (85 percent). The catalyst, therefore, was found to contain 5.4 wt. % P.

EXAMPLE V

Preparation of Catalyst E

A Ni/Sn/P/O catalyst having a Ni:Sn:P atomic ratio of about 3:1:1 was prepared. A 150 ml quantity of 1 molar $Ni(NO_3)_2$ was mixed with 50 ml of 1M $SnSO_4$ and 3.5 ml of $H_3PO_4$ (85 percent). The mixture was then boiled until it became syrupy. The mixture was then further heated in a furnace programmed to reach 1,200° F. in 2 hours, after which it was maintained at 1,200° F. for another 4 hours. During the calcination, the composition foamed, expanded, then solidified into a low density porous mass. This mass was then cooled and crushed to 20–28 mesh particles.

EXAMPLE VI

Oxidative Dehydrogenation of Various Feeds

Each of the Catalysts A–E, whose description is described in preceding examples, was used to promote an oxidative dehydrogenation reaction. In each of the runs, a dehydrogenatable feed was passed over the catalyst within a fixed bed catalytic reactor at atmospheric pressure and at other designated conditions. After a period of time on stream, the gaseous effluent from the reaction zone was sampled and analyzed by gas-liquid chromatography. From these results, the conversion and yields to various products were calculated. The results of these runs are shown in the following table:

Oxidative Dehydrogenation

| Run | 1 | 2 | 3 | 4 | 5 |
|---|---|---|---|---|---|
| Catalyst | A | B | C | D | E |
| Feed | Butane | Isoamylenes | Butane | Butene-2 | Isopentane |
| GHSV | | | | | |
| Feed | 300 | 400 | 150 | 300 | 1000 |
| Air | 1500 | 3300 | 1500 | 1320 | 5000 |
| Steam | 1580 | 9700 | 3100 | 5500 | 10000 |
| On-stream, hr. | 1 | 12 | 1 | 3 | 0.25 |
| Temp., °F. | 1050 | 1050 | 1050 | 1000 | 1100 |
| Conversion, % | 25 | 60.4 | 44 | 69.6 | 20.5 |
| Yields | | | | | |
| Diolefin | 11 | 38.4 | 15.2 | 54.3 | 4.7 |
| Monoolefin | 4 | — | 6.6 | — | 0 |
| Cracked | 3 | 0.9 | 3.0 | 2.6 | — |
| Carbon Oxides | 7.5 | 21.3 | 18.8 | 12.8 | — |
| Modivity[1] to Mono- and Dienes | 58 | 63.5 | 50.0 | 78 | 23 |

[1] Modivity is a modified selectivity based on analysis of gas phase products for converted hydrocarbons, oxides of carbon and unconverted feed. Conversion/yield are reported on same basis as modivity.

The data in the table above show that the catalysts of the present invention are effective in promoting the oxidative dehydrogenation of several paraffinic and olefinic feedstocks. In particular, Run 1 and Run 3 show one-step oxidative dehydrogenation of butane to substantial amounts of butadiene.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

We claim:

1. A process for the oxidative dehydrogenation of a paraffin hydrocarbon feedstock having from two to 12 carbon atoms which comprises contacting said feedstock with a catalyst consisting essentially of (1) at least one ferrous metal selected from the group consisting of nickel, iron and cobalt in an amount sufficient to add to the final catalyst from 26 to 75 weight percent ferrous metal, based on total weight of the final catalyst, (2) at least one tin-containing compound in an amount sufficient to add to the final catalyst about 1 to about 50 weight percent tin, and (3) phosphorus in an amount sufficient to add to the final catalyst about 0.5 to about 10 weight percent phosphorus, wherein at least one of said ferrous metal, tin or phosphorus is combined with oxygen.

2. A process according to claim 1 wherein the amount of said ferrous metal is in the range of about 30 to about 45 weight percent, the amount of said tin is in the range of about 14 to about 35 weight percent, and the amount of said phosphorus is in the range of about 2 to about 6 weight percent.

3. A process according to claim 1 wherein said feedstock comprises butane.

4. A process according to claim 3 wherein said catalyst consists essentially of 26 weight percent nickel, 47 weight percent tin, 4.7 weight percent phosphorus and 0.2 weight percent potassium.

5. A process according to claim 3 wherein said catalyst consists essentially of 32 weight percent nickel, 37 weight percent tin, 2.8 weight percent phosphorus and 0.09 weight percent potassium.

6. A process according to claim 1 wherein said feedstock comprises isopentane.

7. A process according to claim 6 wherein said catalyst has a Ni:Sn:P ratio of 3:1:1.

8. The process of claim 1 wherein said feedstock is a paraffin hydrocarbon having from four to 12 carbon atoms.

* * * * *